United States Patent
Resios et al.

(10) Patent No.: US 10,834,210 B1
(45) Date of Patent: Nov. 10, 2020

(54) SYNCHRONIZING A PERSONAL WORKSPACE ACROSS MULTIPLE COMPUTING SYSTEMS IN A CODING ENVIRONMENT

(71) Applicant: Amazon Technologies, Inc., Seattle, WA (US)

(72) Inventors: Andreas Resios, Iaşi (RO); Mihai Diac, Iaşi (RO); Ovidiu Stanciu, Braşov (RO)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/668,293

(22) Filed: Aug. 3, 2017

(51) Int. Cl.
G06F 17/00 (2019.01)
H04L 29/08 (2006.01)
H04M 3/42 (2006.01)

(52) U.S. Cl.
CPC ............ H04L 67/16 (2013.01); H04L 67/306 (2013.01); H04M 3/42161 (2013.01); *G06F 17/00* (2013.01); *H04L 67/00* (2013.01)

(58) Field of Classification Search
CPC ....... H04L 67/00; H04L 67/16; H04L 67/306; H04M 3/42161; G06F 17/00
USPC .................................................. 715/229, 764
See application file for complete search history.

(56) References Cited

U.S. PATENT DOCUMENTS

| | | | | |
|---|---|---|---|---|
| 6,393,437 B1 * | 5/2002 | Zinda | ........................ | G06F 8/20 200/203 |
| 7,519,953 B2 * | 4/2009 | Reissman | ........... | G06F 11/3672 707/999.102 |
| 7,603,670 B1 * | 10/2009 | van Rietschote | ..... | G06F 9/4856 718/1 |
| 7,694,291 B2 * | 4/2010 | Chen | ........................ | G06F 8/71 717/162 |
| 8,117,613 B2 * | 2/2012 | Uyeda | ................... | G06F 9/4856 718/1 |
| 8,166,477 B1 * | 4/2012 | Tormasov | ............. | G06F 9/4418 718/1 |
| 8,285,662 B2 * | 10/2012 | Bitonti | ...................... | G06F 8/71 706/47 |
| 8,312,447 B2 * | 11/2012 | Callaghan | ............... | G06F 8/443 717/175 |
| 8,615,737 B2 * | 12/2013 | Walsh | ..................... | G06F 21/53 717/120 |
| 8,631,066 B2 * | 1/2014 | Lim | ...................... | G06F 9/5077 709/203 |

(Continued)

*Primary Examiner* — Andrew R Dyer
(74) *Attorney, Agent, or Firm* — Lowenstein Sandler LLP

(57) ABSTRACT

A system and method for synchronizing or moving a personal workspace from a first computing system (e.g., a laptop) to a cloud-based computing system in a software development environment. The personal workspace synchronization service identifies changes made to the source code as a result of activities performed in the personal workspace of the first computing system. The source code changes are identified by comparing a snapshot of a current image of a container including personal workspace executing on the first computing system to a base container image of the personal workspace. The identified source code changes are transferred by the personal workspace synchronization service to the cloud-based computing system to generate an updated personal workspace on the cloud-based computing system that matches the personal workspace of the first computing system.

19 Claims, 6 Drawing Sheets

(56) References Cited

U.S. PATENT DOCUMENTS

| | | | | |
|---|---|---|---|---|
| 8,954,938 B2* | 2/2015 | Krueger | G06F 8/70 | 707/802 |
| 9,110,693 B1* | 8/2015 | Meiri | G06F 9/4856 | |
| 9,250,893 B2* | 2/2016 | Blahaerath | G06F 8/71 | |
| 9,286,040 B2* | 3/2016 | Halley | G06F 8/41 | |
| 9,619,216 B2* | 4/2017 | Wisgo | H04W 4/00 | |
| 9,652,225 B1* | 5/2017 | Bohn | G06F 16/00 | |
| 2001/0016879 A1* | 8/2001 | Sekiguchi | G06F 9/4843 | 719/319 |
| 2005/0154676 A1* | 7/2005 | Ronning | G06Q 20/10 | 705/44 |
| 2007/0050762 A1* | 3/2007 | Chen | G06F 8/71 | 717/169 |
| 2008/0091669 A1* | 4/2008 | Anderson | G06F 16/211 | |
| 2008/0244522 A1* | 10/2008 | Bernin | G06F 8/71 | 717/122 |
| 2009/0260004 A1* | 10/2009 | Datta | G06F 8/65 | 717/175 |
| 2010/0138810 A1* | 6/2010 | Komatsu | G06F 8/30 | 717/107 |
| 2011/0055299 A1* | 3/2011 | Phillips | G06F 9/45533 | 707/827 |
| 2011/0209923 A1* | 9/2011 | Schererz | G01G 19/005 | 177/1 |
| 2011/0276939 A1* | 11/2011 | Frankin | G06F 8/20 | 717/101 |
| 2012/0167048 A1* | 6/2012 | Walsh | G06F 21/53 | 717/122 |
| 2012/0324417 A1* | 12/2012 | Somani | G06F 8/30 | 717/101 |
| 2013/0227572 A1* | 8/2013 | Hosono | G06F 11/3664 | 718/1 |
| 2014/0063060 A1* | 3/2014 | MacIocci | G06T 19/006 | 345/633 |
| 2014/0280528 A1* | 9/2014 | Brandes | G06F 15/177 | 709/204 |
| 2015/0089497 A1* | 3/2015 | Borzycki | G06F 21/53 | 718/1 |
| 2015/0205630 A1* | 7/2015 | Hu | G06F 3/1423 | 718/1 |
| 2015/0248280 A1* | 9/2015 | Pillay | G06F 8/60 | 717/106 |
| 2015/0293753 A1* | 10/2015 | Kim | G06F 8/47 | 717/136 |
| 2015/0339136 A1* | 11/2015 | Suryanarayanan | G06F 9/455 | 718/1 |
| 2016/0140447 A1* | 5/2016 | Cohen | G06N 5/02 | 706/52 |
| 2016/0162906 A1* | 6/2016 | Irby | G06Q 30/018 | 705/317 |
| 2016/0291856 A1* | 10/2016 | von Muhlen | G06F 3/04817 | |
| 2016/0321033 A1* | 11/2016 | Mihalcea | G06F 8/71 | |
| 2017/0052880 A1* | 2/2017 | Rosomoff | G06F 8/70 | |
| 2017/0192802 A1* | 7/2017 | Sampathkumar | G06F 9/45508 | |
| 2017/0344345 A1* | 11/2017 | Fan | G06F 8/71 | |
| 2018/0081683 A1* | 3/2018 | Shuster | G06Q 10/06311 | |
| 2019/0034320 A1* | 1/2019 | Stokes | G06F 11/3664 | |
| 2019/0052551 A1* | 2/2019 | Barczynski | H04L 41/12 | |

* cited by examiner

SYNCHRONIZING A PERSONAL WORKSPACE ACROSS MULTIPLE COMPUTING SYSTEMS IN A CODING ENVIRONMENT

BACKGROUND

In software development systems, personal workspaces are employed by developers to build and test source code. The personal workspace represents a developer's platform to work on respective development tasks. For example, a developer may use a mobile development device (e.g., a laptop) to establish a personal workspace including a personal staging environment (PSE) that allows the developer to rapidly test source code changes. A developer may establish the personal workspace in an offline mode in a low latency environment, but is unable to synchronize the personal workspace with another computing platform (e.g., a robust cloud computing environment) to enable collaboration among developers.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
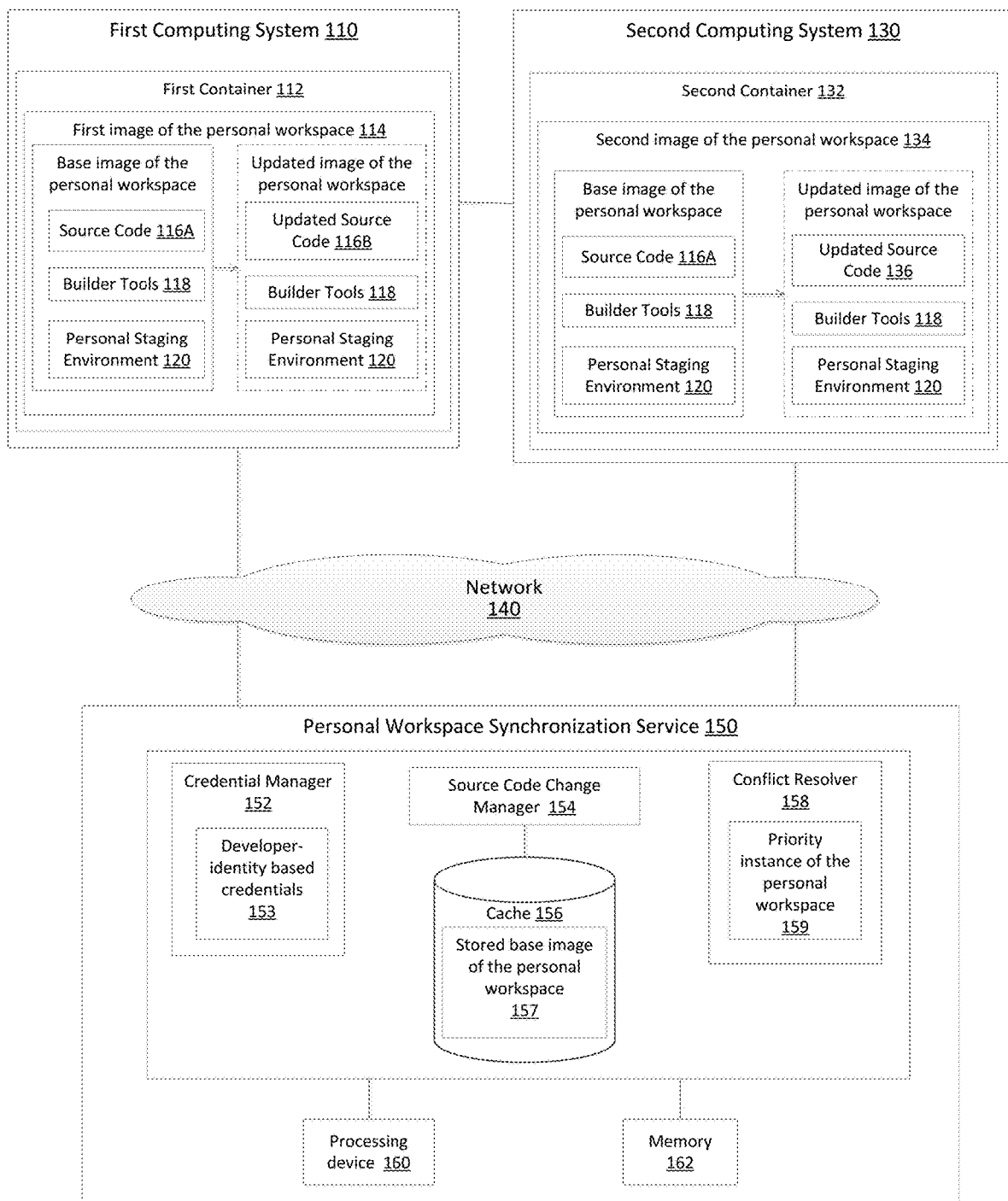
FIG. 1 illustrates an example environment including a personal workspace synchronization service, according to one embodiment.

Embodiments described herein relate to synchronizing or moving a personal workspace from a first computing system (e.g., a mobile computing system, such as a laptop) to a second computing system (e.g., a cloud-based computing system) to enable sharing and collaboration between multiple developers. In one embodiment, a personal workspace synchronization service is employed to manage and execute the synchronization of a personal workspace maintained in a container of the first computing system. In one embodiment, a container or container image is a lightweight, stand-alone, executable software package that includes the components needed to run the software package, such as, for example, the software code, runtime environment, system tools, system libraries, settings, etc.

In one embodiment, the container with the personal workspace may include a software development environment including source code, development or builder tools, and a personal staging environment (PSE) where a developer may make and test source code changes. For example, a developer may perform activities relating to source code in development in a personal workspace using his or her mobile computing device (e.g., a laptop). In one embodiment, the personal workspace is accessible via a web browser. In one embodiment, the personal workspace synchronization service enables the "portability" of the personal workspace accessed by a developer via the mobile computing device, by synchronizing the personal workspace to another workspace on another computing system for execution by the other computing system (e.g., a cloud-based computing environment having a higher computing capacity than the mobile computing device).

In one embodiment, a first container on the first computing system (e.g., the mobile computing device) and a second container on the second computing system (e.g., a cloud-based or remote computing system) are established with the same image, during a setup phase. In one embodiment, the base image established on both the first and second computing systems is stored in a memory associated with the personal workspace synchronization service.

In one embodiment, the first computing system performs activities (e.g., including executing changes to the source code) in the personal workspace maintained in the first container during an active mode. In one embodiment, a request to synchronize the personal workspace is processed by the personal workspace synchronization service. For example, a first developer (e.g., a developer using a personal workspace on her laptop to develop software) may wish to collaborate with one or more other developers operating in a cloud-based computing environment. In this example, the first developer may use the first computing system to send a request to the personal workspace synchronization service.

In one embodiment, the personal workspace synchronization service pauses the container of the first computing system to capture a "snapshot" or record of the current image of the personal workspace as executed by the first computing system. In one embodiment, the container of the first computing system is transitioned from an active mode (e.g., wherein the first container is active and represents the operating instance of the personal workspace) to a paused mode (e.g., wherein the snapshot of the container image is captured and stored, while the one or more applications and executables of the container continue to run).

In one embodiment, the personal workspace synchronization service identifies the changes to the source code that were executed in the personal workspace of the first computing system. In one embodiment, the changes are identified by comparing the snapshot of the first container (e.g., the current image of the personal workspace) to the base image of the personal workspace.

In one embodiment, the identified changes are transferred by the personal workspace synchronization service to the second computing system. In one embodiment, the initial or base container image maintained by the second computing system is updated with the identified changes so that the image of the personal workspace on the second computing system matches the image of the personal workspace of the first computing system. In one embodiment, in view of the updating of the personal workspace of the second computing system, the personal workspace of the first computing system has been "ported" or "moved" to the second computing system, such that activities may be performed by one or more other developers via the second computing system's personal workspace. In one embodiment, the container including the second image of the personal workspace operating on the second computing system may be transitioned from an inactive mode to an active mode to enable activities to be performed in the updated personal workspace of the second container (e.g., the container in the cloud-based or remote computing system.)

In one embodiment, the synchronization processing may be performed iteratively to enable the repeated moving of the personal workspace between the first computing system and the second computing system. For example, activities performed by the second computing system resulting in source code changes may be identified and transferred to the first computing system to allow a developer using the first computing system to assume control of the personal workspace (e.g., transition from an inactive mode to an active mode).

Advantageously, in one embodiment, the personal workspace may be shared between two or more computing systems (e.g., a laptop device and a cloud-based computing system) to enable collaboration and improved computing resource optimization relating to software development and testing.

In the following discussion, embodiments of the system and its components are described. Although the description includes certain examples relating to the synchronization of personal workspaces between multiple computing systems, it is to be appreciated that the systems and methods described herein are not limited to the enumerated examples.

FIG. 1 illustrates an example of an environment including a personal workspace synchronization service 150 configured to synchronize a personal workspace across multiple computing systems including a first computing system 110 and a second computing system 130. In one embodiment, the personal workspace synchronization service 150 includes a credential manager 152, a source code change manager 154, and a conflict resolver 158 configured to perform functionalities associated with the synchronization of personal workspaces. In one embodiment, the personal workspace synchronization service 150 is a web-based service that is communicatively coupled to the first computing system 110 and the second computing system 130 via a suitable network 140, including, for example, the Internet, intranets, extranets, wide area networks (WANs), local area networks (LANs), wired networks, wireless networks, or other suitable networks, etc., or any combination of two or more such networks. In one embodiment, the personal workspace synchronization service 150 includes a processing device 160 and a memory 162 configured to execute and store instructions associated with the functionality of the various components, services, and modules of the personal workspace synchronization service 150, as described in greater detail below in connection with FIGS. 1-6.

In one embodiment, the first computing system 110 is a mobile computing system (e.g., a laptop) and the second computing system is a cloud-based computing environment (e.g., Amazon Web Services (AWS)). In one embodiment, the first computing system 110 and the second computing system 130 are configured to provide a platform to one or more developers to develop, build, and test source code (e.g., source code 116A, 116B, and 136 in FIG. 1).

As shown in FIG. 1, the first computing system 110 includes a first container 112 having a personal workspace. In one embodiment, during a setup mode, the first image of the personal workspace 1142 is a base image (or reference image) including source code 116A, builder tools 118, and a personal staging environment 120. As shown in FIG. 1, the second computing system 130 includes a second container 132 including a second image of the personal workspace 134. In one embodiment, like the first image of the personal workspace 114 maintained by the first container 112, the second image of the personal workspace 134 is the base image including source code 116A, the builder tools 118, and the personal staging environment 120. In one embodiment, during a setup mode, the images maintained by the respective computing systems match one another so that the base image of the personal workspace may be stored by the personal workspace synchronization service 150 and used as a reference in comparing source code changes, as described in greater detail below. In one embodiment, during a setup mode, both the first image 132 and the second image 134 include the same base image of the personal workspace (e.g., source code 116A, builder tools 118, and personal staging environment 120). In one embodiment, during the setup mode, the personal workspace synchronization service 150 stores a copy of the base image of the personal workspace 157. In one embodiment, the personal workspace synchronization service 150 pre-caches the stored base image of the personal workspace 157 in a cache 156. In one embodiment, the cache 156 may be a part of the memory 162.

In one embodiment, the first computing system 110 may operate in an active mode wherein a developer may perform activities using the first image of the personal workspace 114. In one embodiment, the activities may include the implementation of changes to the source code 116A, thereby producing updated source code 116B. As shown in FIG. 1, as a result of activities performed during the active mode, the first image of the personal workspace 114 may change from the base image of the personal workspace to an updated image of the personal workspace. In one embodiment, the updated image of the personal workspace includes updated source code 116B, the builder tools 118, and the personal staging environment 120.

In one embodiment, a synchronization of the personal workspace may be initiated. In one embodiment, a request to synchronize the personal workspace may be received from either of the first computing system 110 or the second computing system 130. For example, the first computing system 110 may be a local laptop of a first developer that is operating in an offline mode, wherein the activities in the personal workspace are performed offline. After an activity period, the first developer may initiate a request to the personal workspace synchronization service 150 via the network 140 to synchronize the current image of the personal workspace (e.g., the updated image of the personal workspace, as shown in FIG. 1) to the second computing system 130. For example, the first developer may wish to use the cloud-based system to perform certain activities in the personal workspace that utilize a higher processing power, such that the first developer wishes to "switch" to the cloud-based computing system top.

In one embodiment, the credential manager 152 of the personal workspace synchronization service 150 maintains credentials associated with the personal workspace. In one embodiment, the credential may be used as a security measure to ensure the request for synchronization of the personal workspace is valid. In one embodiment, the credentials may be used to confirm that the personal workspace may be moved from the first computing system 110 to the second computing system 130. In one embodiment, the credentials may be formulated based on a developer's identity (i.e., the developer-identity based credentials 153). In this embodiment, the developer-identity based credentials 153 are based on identification information that is associated with a developer (e.g., the first developer in the above example), as compared to the use of hard-coded credentials. In one embodiment, the developer-identity based credentials 153 are temporary credentials based on information associated with the developer that may be provided to an external authority to confirm a link between the developer's identity and multiple computing systems (e.g., the first computing system 110 and the second computing system 130). In one example, for a planned collaboration between multiple developers using multiple different computing systems, the developer-identity based credentials 153 may be generated based on information identifying the multiple developers. In one embodiment, the developer-identity based credentials 153 may be authenticated by an external authority to confirm that it is permissible to share the personal workspace across the multiple containers of the multiple computing systems.

In one embodiment, the source code change manager 154 determines the one or more changes to the source code that were made by the first computing system 110 during the active mode. In one embodiment, a set of source code changes (e.g., one or more changes) is identified by comparing a current image of the personal workspace on the first computing system 110 to the stored base image of the personal workspace 157. In one embodiment, the set of source code changes or delta may be identified by pausing the first container 112 (i.e., placing the first container 112 in a paused mode). In one embodiment, while in the paused mode, a "snapshot" of the current image of the personal workspace is captured. In the example shown in FIG. 1, a snapshot is taken of the current image of the personal workspace (e.g., the updated image of the personal workspace). In one embodiment, in the paused mode, operations of the container (e.g., the personal stack) are temporarily suspended or paused, while other processes of the computing system are capable of running.

In one embodiment, the source code changes are determined by comparing the updated source code 116B of the image snapshot to the source code 116A of the stored base image of the personal workspace 157. In one embodiment, the identified source code changes (e.g., the differences between the source code 116A and the updated source code 116B) are transferred by the personal workspace synchronization service 150 to the second computing system 130. In one embodiment, advantageously as compared to transferring the entire first container 112 to the second computing system 130, the transfer to the second computing system 130 includes the source code bits corresponding to the one or more changed or updated portions of the source code, to realize a savings in the amount of bandwidth needed to synchronize the personal workspace. In one embodiment, the set of changes received by the second computing system 130 are made to the source code 116A of the base image of the personal workspace to produce the updated image of the personal workspace. In one embodiment, the updated image of the personal workspace includes the updated source code 136 (e.g., the source code 116A as updated to incorporate the source code changes).

In one embodiment, the second computing system 130 may be placed into an active mode wherein one or more developers may perform activities using the updated image of the personal workspace. In one embodiment, the personal workspace synchronization service 150 may update the cache 156 to store a new base image of the personal workspace. For example, the new stored base image of the personal workspace may be the updated image of the personal workspace as maintained by the first container 112 and the second container 132.

In one embodiment, the personal workspace synchronization service 150 may include a conflict resolver 158 configured to resolve conflicts in the event multiple instances of the personal workspace have been changed. In one embodiment, the conflict resolver 158 may identify and maintain a priority instance of the personal workspace 159. In one embodiment, the priority instance of the personal workspace 159 may be identified by adopting the changes made by the most recently accessed instance of the personal workspace. In one embodiment, the priority instance of the personal workspace 159 may be identified by designating the instance maintained by a cloud-based computing system (e.g., the second image of the personal workspace 134) as having priority over a local or mobile instance of the personal workspace (e.g., the first image of the personal workspace 114) and adopting the changes made via the cloud-based computing system.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to the use of a server is merely by way of example, and other suitable computing devices known to those of skill in the art may be employed. For example, the first computing system 110 and the second computing system 130 may have installed thereon one or more client programs configured to perform the functionality described herein in connection with the personal workspace synchronization service 150. In this embodiment, a "peer-to-peer" arrangement may be employed wherein the source code changes are shared between the multiple computing systems via a suitable peer network.

Figure 2:
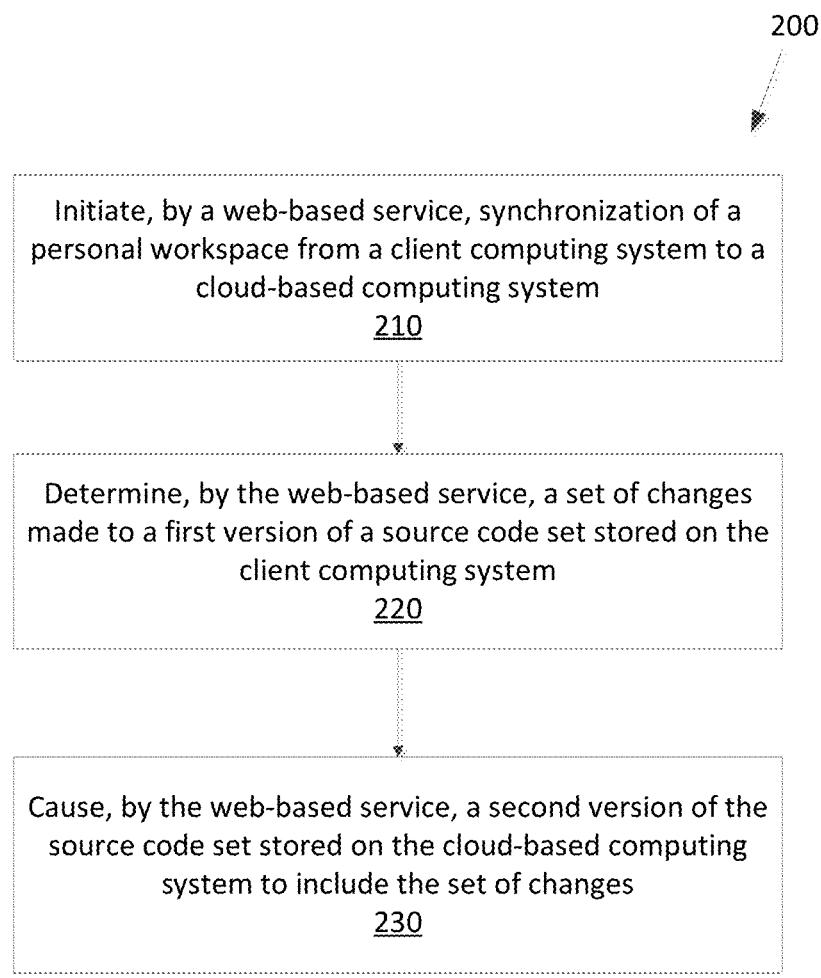
FIG. 2 depicts a flowchart illustrating an example of functionality implemented by a personal workspace synchronization service, according to one embodiment.

FIG. 2 illustrates a flowchart that provides an example of a process 200 executed by a personal workspace synchronization service (e.g., personal workspace synchronization service 150 of FIG. 1), according to various embodiments of the present disclosure. It is understood that the flowchart of FIG. 2 provides an example of the many different types of functional arrangements that may be employed to implement the operation of the personal workspace synchronization service 150 as described herein. Process 200 may be performed by a processing logic that may comprise hardware (e.g., circuitry, dedicated logic, programmable logic, microcode, etc.), software (e.g., instructions run on a processing device), or a combination thereof.

In one embodiment, the process 200 is employed in an environment including a first computing system (i.e., a client computing system, such as a laptop) and a cloud-based computing system. In one embodiment, a first developer may be performing activities in instance of a personal workspace active on the client computing system. In this embodiment, the first developer may wish to "switch" and continue his or her development activities using the cloud-based computing system.

In block 210, a web-based service (e.g., the personal workspace synchronization service 150 of FIG. 1) may initiate a synchronization of the personal workspace from the client computing system to the cloud-based computing system. In one embodiment, the web-based service may initiate the synchronization in response to a request received from one of the client computing system or the cloud-based computing system.

In block 220, the web-based service determines a set of changes made to a first version of a source code set stored on the client computing system. In one embodiment, the first version of the source code set is stored as a base version in a cache associated with the web-based service. In one embodiment, an updated version of the source code set stored on the client computing system is compared to a base version of the source code set previously stored by the web-based service. In one embodiment, the stored base version or image is identified during a setup phase wherein the client computing system and the cloud-based computing system maintain the same image. In one embodiment, the first version of the source code set is a version maintained in an instance of the personal workspace executing on the client computing system. In one embodiment, a developer (e.g., the first developer) implements the set of changes to the first version of the source code set using the personal workspace accessed via the client computing system.

In block 230, the web-based service updates a second version of the source code set stored on the cloud-based computing system to include the set of changes. In one embodiment, the second version of the source code set is the same as the base version stored in a memory associated with the web-based service. In one embodiment, updating the second version of the source code set incorporates the source code changes implemented using the personal workspace of the client computing system. In one embodiment, following execution of block 230, the personal workspace accessible by the cloud-based computing system is synchronized with the personal workspace accessed via the client computing system. In one embodiment, a developer may access the updated second version of the source code set (e.g., the updated image of the personal workspace in FIG. 1) using the cloud-based computing system to perform development activities using the personal workspace.

In one embodiment, the process 200 may be performed iteratively such that the personal workspace may be synchronized from a cloud-based computing system in the active mode to the client computing system, another cloud-based computing system, or another client computing system. In one embodiment, following the execution of process 200, the web-based service may update the stored base image of the personal workspace for future reference during a subsequent synchronization processing. For example, the updated stored base image may be equivalent to the updated second version of the source code set produced in block 230, as described above.

Figure 3:
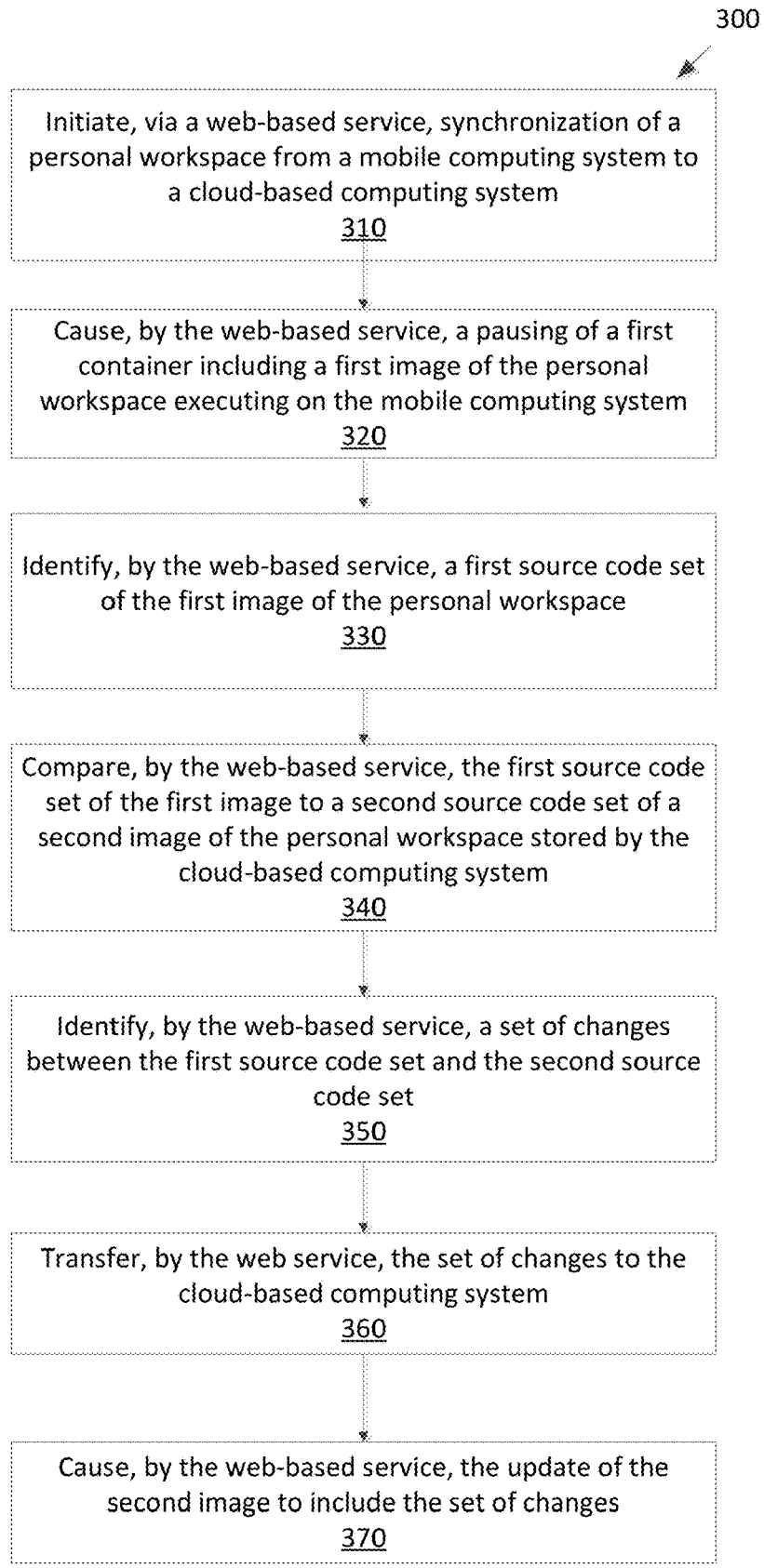
FIG. 3 depicts a flowchart illustrating an example of functionality implemented by a personal workspace synchronization service, according to one embodiment.

FIG. 3 illustrates a flowchart that provides an example of a process 300 executed by a personal workspace synchronization service (e.g., personal workspace synchronization service 150 of FIG. 1), according to various embodiments. It is understood that the flowchart of FIG. 3 provides an example of the many different types of functional arrangements that may be employed to implement the operation of the personal workspace synchronization service as described herein. Process 300 may be performed by a processing logic that may comprise hardware (e.g., circuitry, dedicated logic, programmable logic, microcode, etc.), software (e.g., instructions run on a processing device), or a combination thereof.

In block 310, via a web-based service, synchronization is initiated between a mobile computing system (e.g., a laptop) and a cloud-based computing system (e.g., one more remote computing systems having a larger computing capacity than the mobile computing system). In one embodiment, the synchronization may be initiated in response to a request from a developer (e.g., via the mobile computing system or the cloud-based computing system) or according to a schedule.

In block 320, the web-based service causes a first container including a first image of the personal workspace executing on the mobile computing device to pause. In one embodiment, the first container is placed into a paused mode wherein a snapshot of a current image of the personal workspace as it is executing on the mobile computing system is captured. In one embodiment, advantageously, while the container (e.g., personal stack) is paused to enable the capturing of the snapshot of the personal workspace, the processes of the mobile computing device may continue to run. In one embodiment, one or more libraries of the mobile computing system may be used to synchronize the running processes.

In block 330, the web-based service identifies a source code set (i.e., a first source code set) of the first image of the personal workspace (i.e., the snapshot or current image of the personal workspace). In one embodiment, the identified source code set includes source changes or updates made during the development activities executed via the personal workspace.

In block 340, the web-based service compares the first source set of the first image to a second source code set of a second image of the personal workspace stored by the cloud-based computing system. In one embodiment, the second image of the personal workspace is identified by referring to a base image stored in a cache of the web-based service during a setup phase. In one embodiment, the web-based service may retrieve a snapshot of a current version of the second image from the second container of the cloud-based computing system.

In block 350, the web-based service identifies a set of changes between the first source code set and the second source code set. In one embodiment, the set of changes is identified by comparing the source code of the snapshot of the personal workspace (e.g., the first image of the personal workspace including source code changes resulting from the activities performed via the mobile computing system) with the stored image of the personal workspace.

In block 360, the web-based service transfers the set of changes to the cloud-based computing system. In one embodiment, the source code bits associated with the set of source code changes are provided to the container of the cloud-based computing system (e.g., the second container 132 of FIG. 1). In one embodiment, the source code bits may be transferred or provided to the cloud-based computing system in any suitable format and by any suitable communication protocol. In one embodiment, the web-based service may generate a file including the source code bits associated with the set of changes. In one embodiment, transfer of the set of changes in the form of source code bits provides for efficiency in the utilization of bandwidth and network resources.

In block 370, the web-based service causes an update of the second image of the personal workspace maintained by the cloud-based computing system to include the set of changes. In one embodiment, the web-based service may cause the update by sending an instruction or command to the second container to enter a set up mode during which the source code changes may be incorporated into the source code set of the second image of the personal workspace. In one embodiment, following the update, the second image of the personal workspace executing on the cloud-based computing system is the same as the updated first image of the personal workspace captured in blocks 320 and 330. In one embodiment, following block 370, a developer may perform activities in the synchronized personal workspace via the cloud-based computing system. In one embodiment, process 300 may be iteratively performed to provide for repeated synchronization between the multiple computing systems to enable further switches and collaboration via the synchronized personal workspace.

Figure 4:
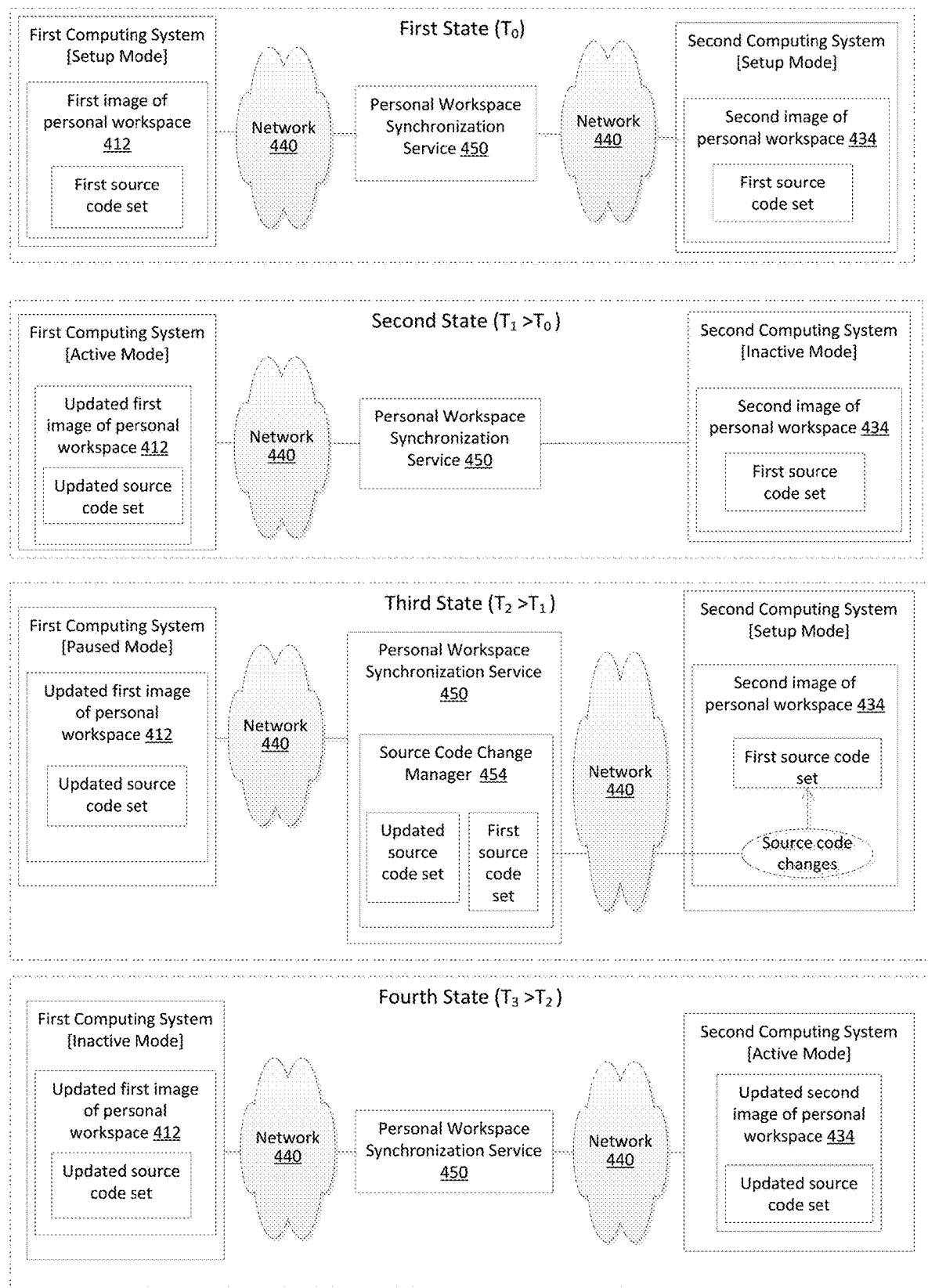
FIG. 4 illustrates example synchronization of a personal workspace, according to one embodiment.

FIG. 4 presents a schematic diagram illustrating exemplary processing performed by a personal workspace synchronization service 450, according to embodiments of the present disclosure. In FIG. 4, the operating states of a computing environment at various times during the synchronization of a personal workspace between a first computing system and a second computing system are shown.

As shown in FIG. 4, in a first state (at a first time identified as $T_0$), the first computing system (e.g., a mobile computing system) and the second computing system (e.g., a cloud-based computing system) are entered into a setup mode. In the setup mode, the first image of the personal workspace 412 including a first code set is also established in the second computing system (i.e., the first image of the personal workspace 412 and the second image of the personal workspace 432 are the same). In one embodiment, the personal workspace synchronization service 450 stores the first image of the personal workspace 412 including the first source code set (or the second image of the personal workspace 434 including the first source code set) as a base image for future reference during a later phase.

At a second time ($T_1$), the environment is in a second state wherein the first computing system is in an active mode and the second computing system is in an inactive mode. In one embodiment, in the active mode, a developer uses the first computing system to perform activities using the first image of the personal workspace. In one embodiment, the activities generate changes to the source code set, thereby producing an updated first image of the personal workspace 412 including updated source code set. In one embodiment, in the inactive mode, the second image of the personal workspace 434 is not accessed or in use on the second computing system.

At a third time ($T_2$), the environment is in a third state wherein the first computing system is in a paused mode and the second computing system is in a setup mode. In one embodiment, in the paused mode, a container including the personal workspace is paused and a snapshot of the updated first image of the personal workspace 412 is captured by the personal workspace synchronization service 450. In one embodiment, the personal workspace synchronization service 450 compares the updated source code set of the updated first image of the personal workspace 412 to the stored base image of the personal workspace (e.g., the first source code set) to identify a set of source code changes. In one embodiment, the second computing system, operating in the setup mode, is provided with the set of source code changes identified by the personal workspace synchronization service 450. In one embodiment, the second computing system incorporates the set of source code changes into the first source code set to produce an updated second image of the personal workspace 434 including an updated source code set.

At a fourth time ($T_3$), the environment is in a fourth state wherein the first computing system is in an inactive mode and the second computing system is in an active mode. In one embodiment, in the active mode, a developer uses the second computing system to perform activities using the updated second image of the personal workspace 434. In one embodiment, the updated second image of the personal workspace 434 is the same as the updated first image of the personal workspace (in the second state). Accordingly, the personal workspace has been synchronized across the multiple computing systems to enable a developer to continue activities via a personal workspace across those systems. In one embodiment, in the inactive mode, the updated first image of the personal workspace 434 is not accessed or in use on the first computing system. In one embodiment, the updated second image of the personal workspace 434 (or the updated first image of the personal workspace 412) is stored as the base or reference image by the personal workspace synchronization service 450.

In an embodiment, the first computing system and the second computing systems may include one or more client components configured to perform the above-described functionalities of the personal workspace synchronization service 450 and execute the synchronization activities via a peer-to-peer communication configuration and protocol.

Figure 5:
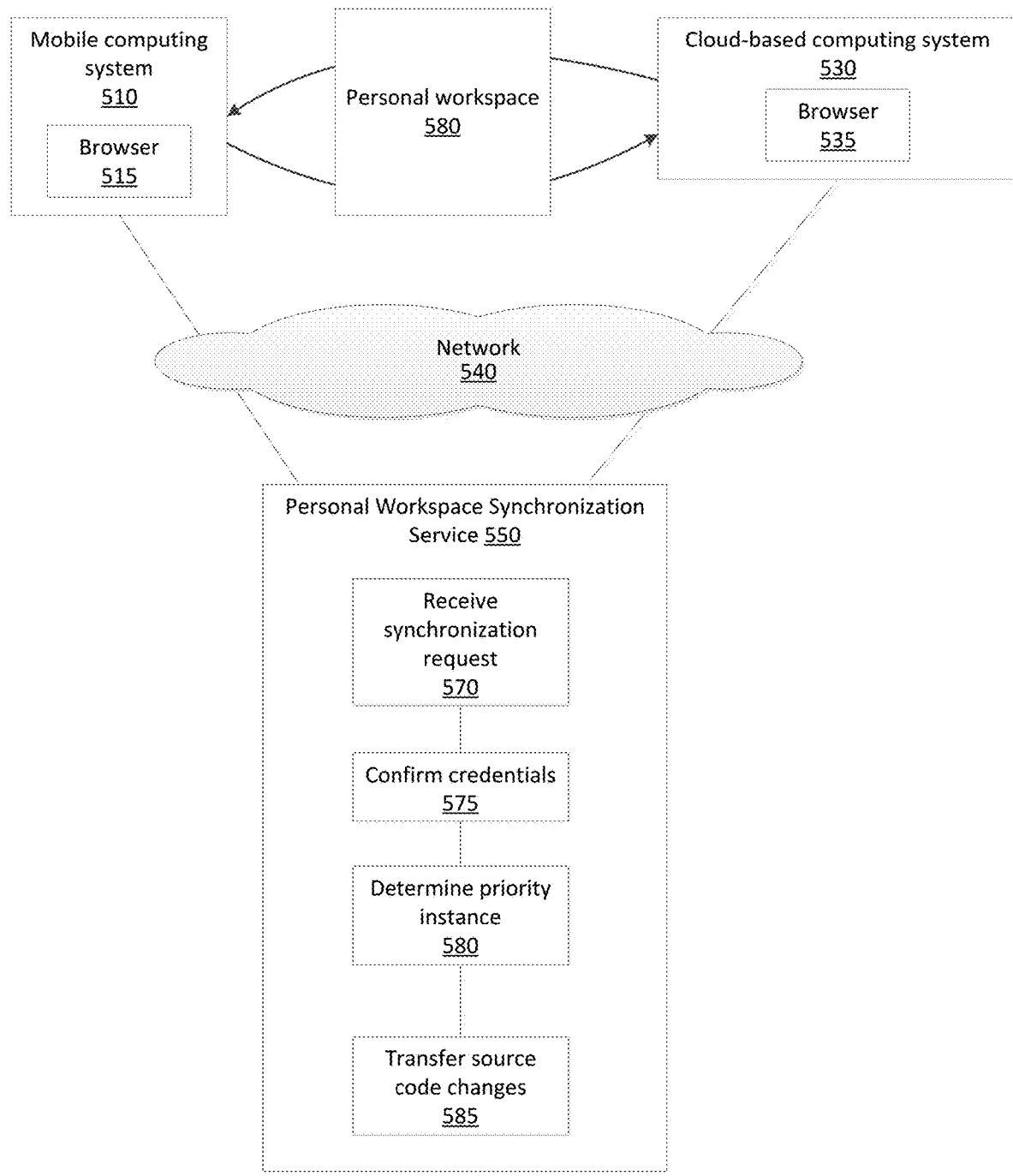
FIG. 5 depicts a schematic diagram illustrating example functionality implemented by a personal workspace synchronization service, according to one embodiment.

FIG. 5 presents a schematic diagram illustrating exemplary processing (blocks 570, 575, 580, and 585) performed by a personal workspace synchronization service 550, according to embodiments of the present disclosure. In FIG. 5, the personal workspace synchronization service 550 performs the functionality in connection with the synchronization of a personal workspace 580 between a mobile computing system 510 and a cloud-based computing system 530.

As illustrated in FIG. 5, the personal workspace synchronization service 550 is configured to receive a synchronization request 570 from the mobile computing system 510, the cloud-based computing system 530, or both. In one embodiment, the synchronization request may be communicated via the network 540. In one embodiment, a user (e.g., a developer) may access the personal workspace synchronization service 550 using a browser 515 of the mobile computing system 510. In one embodiment, a user (e.g., a developer) may access the personal workspace synchronization service 550 using a browser 535 of the cloud-based computing system 530.

In one embodiment, credentials may be included with the synchronization request corresponding to the personal workspace 580. In one embodiment, the personal workspace synchronization service 550 is configured to manage and confirm the credentials to enable the synchronization of the personal workspace 580 in a secure and authenticated manner. In one embodiment, the personal workspace synchronization service 550 is configured to handle the credentials that are associated with or correspond to a container or personal stack, a developer, the personal workspace 580, or a combination thereof. In one embodiment, the credential may be configured to work the same locally (i.e., at the mobile computing system 510) and in the cloud-based network (i.e., at the cloud-based computing system 530). In one embodiment, a Kerberos protocol may be employed to enable the authentication of the credentials in a secure manner. In one embodiment, the credentials may that are distributed to the one or more services in the container and the personal workspace 580. In one embodiment, the personal workspace synchronization service 550 may use a federated identity protocol wherein an external authority is used to authenticate the credentials and confirm that the personal workspace 580 may be ported between the mobile computing system 510 and the cloud-based computing system 530.

In block 580, the personal workspace synchronization service 550 is configured to resolve conflicts (e.g., using the conflict resolver 158 of FIG. 1) in the event multiple instances of the personal workspace have been changed. For example, the personal workspace synchronization service 550 may determine that a first instance of the personal workspace 580 executing on the mobile computing system 520 and a second instance of the personal workspace 580 executing on the cloud-based computing system 530 have undergone different changes. In one embodiment, to reconcile this conflict, a priority instance of the personal workspace 580 is determined. In one embodiment, the priority instance of the personal workspace 580 may be identified by adopting the changes made by the most recently accessed instance of the personal workspace 580 by analyzing an access time associated with the respective instances. In one embodiment, the priority instance of the personal workspace 580 may be identified by designating the instance maintained by a cloud-based computing system 530 as having priority over a local or mobile computing system 510 and adopting the changes made via the cloud-based computing system 530. In one embodiment, in block 585, the personal workspace synchronization service 550 is configured to transfer the source code changes following the confirmation of the credentials (block 575) and the determination of a priority instance (block 580).

Figure 6:
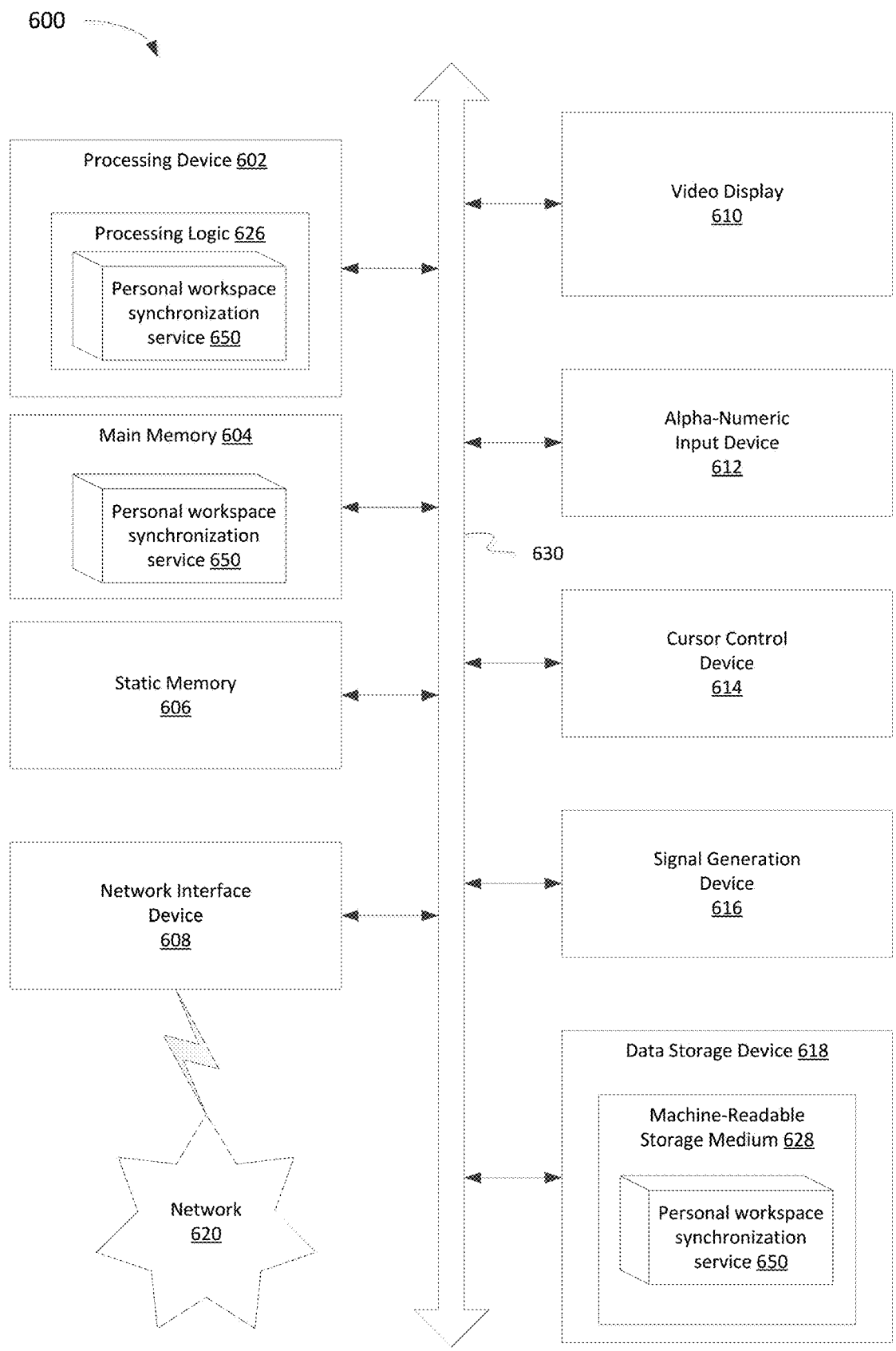
FIG. 6 is a schematic block diagram that provides an example illustration of a computing environment executing instructions relating to testing candidate code, according to one embodiment.

FIG. 6 illustrates a diagrammatic representation of a machine in the example form of a computer system 600 within which a set of instructions 650, for causing the machine to perform any one or more of the methodologies discussed herein, may be executed. In one embodiment, the instructions 650 may enable execution of and the functionality described in connection with FIG. 1-5 (e.g., process 200 of FIG. 2 and process 300 of FIG. 3) by a personal workspace synchronization service (e.g., the personal workspace synchronization service 150 in FIG. 1).

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. In one embodiment, computer system 600 may represent the personal workspace synchronization service 150 of FIG. 1, the personal workspace synchronization service 450 of FIG. 4, and the personal workspace synchronization service 550 of FIG. 5.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for a personal workspace synchronization service for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium6 on which is stored one or more sets of instructions of the personal workspace synchronization service 6embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "initiating", "determining", "updating", "storing", "causing", "identifying", "comparing", "transferring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    initiating, via a web-based service executed by a processing device, synchronization of a personal workspace from a mobile computing system to a cloud-based computing system;
    causing, by the web-based service, a pausing of a first container comprising a first image of the personal workspace executing on the mobile computing system;
    identifying, by the web-based service, a first source code set of the first image of the personal workspace;
    comparing, by the web-based service, the first source code set of the first image to a second source code set of a second image of the personal workspace stored by the cloud-based computing system;
    identifying, by the web-based service, a set of changes between the first source code set and the second source code set; transferring, by the web service, the set of changes to a second container of the cloud-based computing system;
    transitioning the first container from an active mode to an inactive mode;
    after transitioning the first container to the inactive mode, transitioning the second container from the inactive mode to the active mode;
    generating, by the web-based service, an updated version of the second image of the personal workspace comprising the set of changes, wherein the updated version of second image matches the first image; and
    after transitioning the second container to the inactive mode, transitioning the first container to the active mode.

2. The method of claim 1, further comprising receiving a request to initiate the synchronization from the mobile computing system accessing the web-based service via a browser.

3. The method of claim 1, further comprising identifying one of a first instance of the personal workspace executing on the mobile computing system or a second instance of the personal workspace executing on the cloud-based computing system as a priority instance of the personal workspace.

4. A system comprising:
    a processing device executing a web-based service; and
    memory to store computer-executable instructions that, if executed, cause the processing device to:
        initiate, by the web-based service, synchronization of a personal workspace from a client computing system to a cloud-based computing system;
        determine, by the web-based service, a set of changes made to a first version of a source code set corresponding to the personal workspace stored on a first container of the client computing system;
        transfer the set of changes to a second container of the cloud-based computing system,
        transition the first container from an active mode to an inactive mode;
        in response to transitioning the first container to the inactive mode, transition the second container from the inactive mode to the active mode;
        generate, by the web-based service, a second version of the source code set corresponding to the personal workspace stored on the cloud-based computing system, wherein the second version of the source code set comprises the set of changes and matches the first version of the source code set; and
        after transitioning the second container to the inactive mode, transition the first container to the active mode.

5. The system of claim 4, wherein the synchronization is initiated in response to a request received from one of the client computing system or the cloud-based computing system.

6. The system of claim 4, wherein the web-based service is accessed by the client computing system via a browser.

7. The system of claim 4, the web-based service to confirm a credential comprising information corresponding to at least one of a user, the first container comprising the personal workspace, or the personal workspace.

8. The system of claim 4, the web-based service to:
cause a pausing of the first container comprising the personal workspace;
store a current image of the first container, wherein the current image comprises the set of changes made to a first version of a source code set corresponding to the personal workspace stored on the client computing system.

9. The system of claim 8, the web-based service to:
compare the current image to a stored base image of the personal workspace;
identify the set of changes; and
transfer, to the cloud-based computing system, a set of source code bits corresponding to the set of changes.

10. The system of claim 4, the web-based service to:
identify, during a setup mode, the first version of the source code corresponding to the personal workspace stored on the client computing system;
identify, during the setup mode, the second version of the source code corresponding to the personal workspace stored on the cloud-based computing system;
confirm the first version and the second version are the same; and
store one of the first version or the second version as a stored base image of the personal workspace.

11. The system of claim 4, the web-based service to identify one of a first instance of the personal workspace executing on the mobile computing system or a second instance of the personal workspace executing on the cloud-based computing system as a priority instance of the personal workspace.

12. The system of claim 4, wherein the set of changes made to the first version of the source code set are a result of one or more activities performed using the personal workspace stored on the client computing system.

13. The system of claim 4, the web-based service to store an updated version of the source code set corresponding to the personal workspace executed by the cloud-based computing system.

14. The system of claim 13, the web-based service to identify a second set of changes made to the updated version of the source code set, wherein the second set of changes are generated by one or more activities performed using the personal workspace executed by the cloud-based computing system.

15. A non-transitory computer-readable storage device storing computer-executable instructions that, if executed by a processing device, cause the processing device to:

identify, by a web-based service executed by the processing device, a first source code set of a first image comprising a first source code set corresponding to the personal workspace of a first container of a client computing system;
compare, by the web-based service, the first source code set to a second source code set of a stored base image;
identify, by the web-based service, a set of changes between the first source code set and the second source code set;
transfer, to a second container of a cloud-based computing system, a set of source code bits corresponding to the set of changes;
transition the first container from an active mode to an inactive mode;
in response to transitioning the first container to the inactive mode, transition the second container from the inactive mode to the active mode;
generate, by the web-based service, a second version of the source code set corresponding to the personal workspace stored on the cloud-based computing system, wherein the second version of the source code set comprises the set of changes and matches the first version of the source code set; and
after transitioning the second container to the inactive mode, transition the first container to the active mode.

16. The non-transitory computer-readable storage device of claim 15, the processing device to identify one of a first instance of the personal workspace executing on the client computing system or a second instance of the personal workspace executing on the cloud-based computing system as a priority instance of the personal workspace.

17. The non-transitory computer-readable storage device of claim 15, wherein the set of changes are generated by one or more activities performed in the personal workspace executed on the client computing system.

18. The non-transitory computer-readable storage device of claim 15, the processing device to:
identify, during a setup mode, the first image corresponding to the personal workspace stored on the client computing system;
identify, during the setup mode, a second image corresponding to the personal workspace stored on the cloud-based computing system; and
confirm the first version and the second version are the same; and
store one of the first version or the second version as the stored base container image.

19. The non-transitory computer-readable storage device of claim 15, wherein the web-based service is accessed by at least one of the client computing system or the cloud-based computing system via a browser.

* * * * *